Aug. 13, 1946.  E. B. SCHERL  2,405,673
ELECTRIC WELDING
Filed Jan. 20, 1944
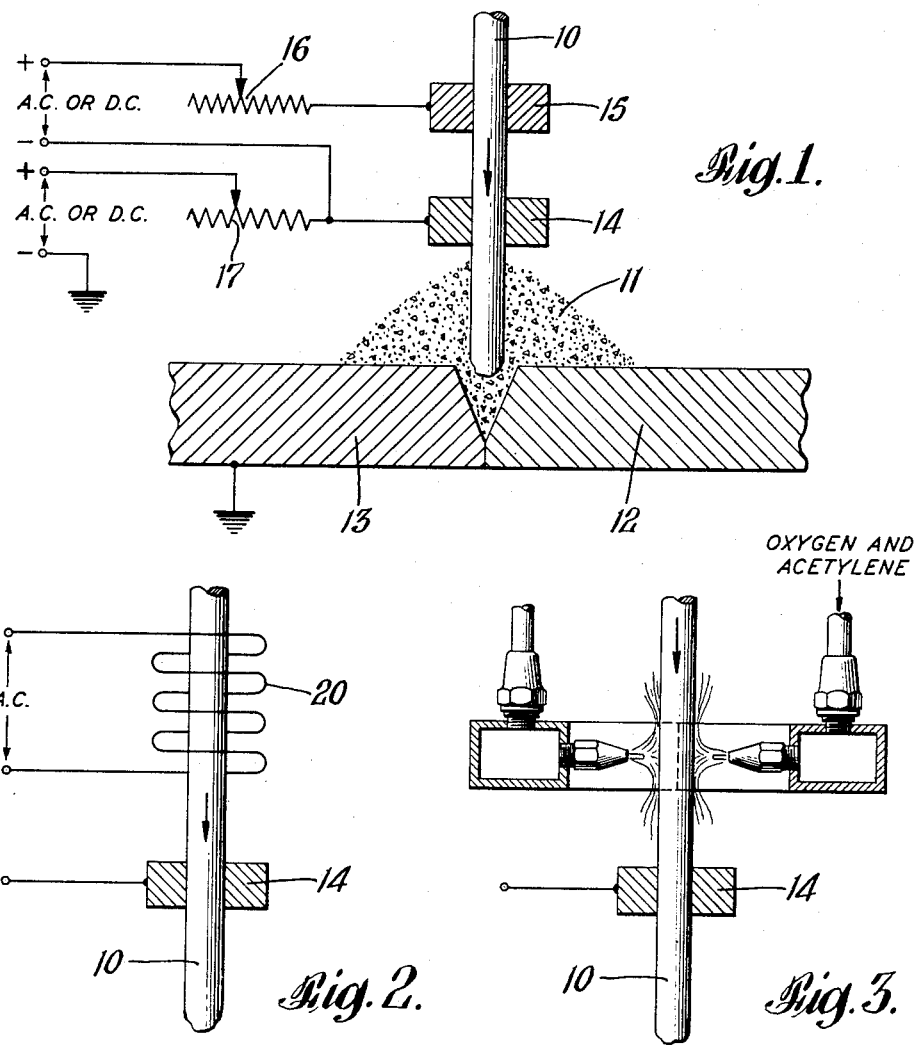
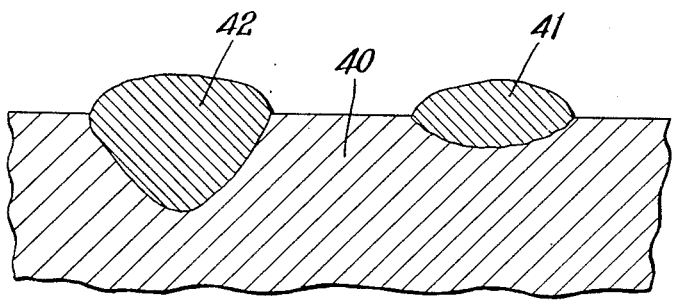
INVENTOR
EGON B. SCHERL
BY
ATTORNEY Patented Aug. 13, 1946

2,405,673

UNITED STATES PATENT OFFICE 2,405,673

ELECTRIC WELDING

Egon B. Scherl, New York, N. Y., assignor to The Linde Air Products Company, a corporation of Ohio Application January 20, 1944, Serial No. 518,915

3 Claims. (Cl. 219—10)

This invention relates to the art of electric welding, and pertains more particularly to improvements in those methods of electric welding in which metal from an electrode is melted and deposited upon one or more metal workpieces to form a joint or a metal overlay.

To form an adequate bond between the deposited metal and the workpiece it is necessary that some metal of the workpiece be melted and coalesced with molten electrode metal. The high temperatures attained in electric welding assure considerable melting or "penetration" of the workpiece, the extent of such penetration being greatest in those methods which achieve rapid welding speeds through the use of heavy welding currents.

For some purposes, for instance the joining of mild steel workpieces, deep penetration of the workpiece and thorough intermingling of molten electrode metal with the molten workpiece metal is desirable as it assures a clean, sound weld deposit substantially homogeneous in chemical and physical properties with the unmelted portions of the workpiece. Thus, in the welding method described for instance in Patent 2,043,960, which comprises depositing metal from a bare electrode carrying a relatively heavy current and blanketing the end of the electrode under a deep layer of granular mineral-like material, the weight ratio of melted workpiece metal to melted electrode metal is ordinarily between 1:1 and 2:1 and may be higher.

But it is not always advantageous to penetrate the workpiece deeply. The heat effects of a relatively large mass of molten metal upon the unmelted metal in areas adjacent the weld may be undesirable, leading to undue softening or undue hardening and in the latter case even to embrittlement and cracking. Such embrittlement and cracking is most likely to be encountered when welding heavy plates of high carbon alloyed steel.

In some welding operations use is made of an electrode composition materially different from that of the workpiece. In such instances, a high ratio of melted workpiece to melted electrode greatly dilutes the deposit, thereby counteracting to a degree the desired effects of the electrode composition. This problem is encountered, for instance, in the art of depositing on a steel base a protective overlay of non-ferrous metal or highly alloyed ferrous metal which has relatively greater resistance to wear or chemical attack or both; but it is also encountered in numerous other arts.

Butt welding of high strength steel by depositing molten electrode metal at the welding seam involves the problems mentioned above, and the problems are particularly acute if the workpieces are of heavy section, as is the case, for instance, in welding heavy armor plate.

In order to take full advantage of the plate strength, the weld metal should be equal in strength to the plate, and many alloy steel electrode compositions have been devised to accomplish this end. Welds prepared with most of these special electrodes are more frequently prone to cracking than are, for example, those made with mild steel. Probably, this is a result of the fine-grained character of the weld metal in the alloy steel deposits, which is likely to produce high contraction stresses. The cracks usually occur in a martensitic zone immediately adjacent to the face of the weld deposit.

Preheating of the workpieces mitigates to some extent this susceptibility to cracking, as does the practice of using a large-diameter electrode with a heavy current to rapidly lay down a large bead. Such measures are not always practicable nor entirely successful, and others have been sought. For instance, considerable success in avoiding cracks has been achieved by the use of electrodes of such composition that the metal in the fused zone of the weld is, upon solidification, austenitic in character and therefore inherently ductile. In choosing the electrode composition, dilution by melted metal of the workpiece must be carefully considered to insure the proper structural nature of the weld. It is apparent that such dilution is wasteful of relatively expensive alloying ingredients such as chromium, nickel, and manganese, and if very great may require the use of such highly alloyed electrode materials that the problem of fabricating the electrodes becomes very difficult and even impractically expensive. No ready method has heretofore been found to reduce the dilution to a very low proportion. It is the principal object of this invention to provide a method to reduce the dilution of electrode metal by workpiece metal. Another object is a method to decrease the penetration of a steel workpiece during electric welding.

In its simplest and broadest form the invention is a method which comprises applying to a metal welding electrode heat in addition to that derived from the welding current. The additional heat may be derived from electric currents induced or conducted into the electrode or from any other appropriate source such as a gas flame.

In the accompanying drawing:

Fig. 1 is an elevation, partly schematic and partly in section, of a typical apparatus suitable for the practice of the method of this invention;

Fig. 2 shows, partly schematically, a modified form of part of such apparatus;

Fig. 3 shows, partly schematically, another modified form of part of the apparatus of Fig. 1, and Fig. 4 is a cross section of a steel workpiece containing deposits made, respectively, without and with preheated electrodes.

Referring to the Figs. 1 to 3, in a preferred form the invention comprises applying additional heat to a bare metal electrode 10, for example of austenitic steel, while the end of such electrode is melted and deposited under a heavy blanket 11 of comminuted mineral-like material at the seam between steel plates 12, 13, for example alloyed high-carbon steel plates such as armor plates. Although, as previously indicated, the invention is not limited to this preferred form, for simplicity of presentation that form is selected as an example for detailed description herein.

The welding current, either alternating or direct, is transmitted from a conventional source to the electrode 10 by conventional means, for instance a collet 14, and flows to the workpiece plates to which the return lead of the current source is attached. As illustrated in Fig. 1, a supplementary heating electric current either alternating or direct, is passed through a portion of the electrode 10 between the collet 14 and a second collet 15. The magnitude of the supplementary heating current may be controlled by a variable resistance 16 or other appropriate means, and the welding current may be controlled in customary manner or by a variable resistor 17.

Alternatively, as shown in Fig. 2, the electrode may be heated inductively by a suitable coil 20 carrying high frequency alternating electric currents. A second alternative, illustrated in Fig. 3, is the use of one or, preferably, several flames directed upon the electrode. These flames may comprise any combustible gas or vapor with any appropriate oxygen-bearing gas, but are preferably oxy-acetylene flames.

Typical results of the use of this invention, in comparison with results obtainable by previously known procedures, are illustrated by the following series of tests. In these tests, the welding method described in Patent 2,043,960 was followed, using steel electrodes one-quarter inch in diameter advanced along the surface of a steel plate at a speed of sixteen inches per minute and at a welding current indicated in the accompanying table. Upon completion of the welds, the plates and welds were cut transversely to the lines of the welds, the cut ends were etched to reveal the metallographic macrostructure of the deposit and surrounding plate areas, and the cross-section areas of portions of the weld (fused metal) above and below the plate surface were measured with a planimeter, with the results listed in the table.

| Test | Current | Total area fused metal, sq. inch | Area fused metal above plate, sq. inch | Volume of electrode metal in weld, per cent | Volume of plate metal in weld, per cent |
|---|---|---|---|---|---|
| 1 | Amperes 800 | 1.09 | 0.37 | 34 | 66 |
| 2 | 500 | 0.41 | 0.19 | 45 | 55 |
| 3 | 500 | 0.40 | 0.31 | 78 | 22 |

Thus, it can be seen that by the method of the invention (Test 3), at 500 amperes the deposit above the plate was far greater than at the same amperage without electrode preheat (Test 2) and nearly as great as at 800 amperes without preheat (Test 1). Even more importantly, the deposit made according to the invention contained 3.5 times as much electrode metal as plate metal, as compared with electrode metal to plate metal ratios of 1 to 1.2 and 1 to 1.94 in Tests 2 and 1, respectively.

Fig. 4 is a scale drawing of the deposits made in Test 1 (42) and Test 3 (41) on the steel workpiece 40, showing the considerable decrease in penetration of the workpiece brought about by the application of preheat to the electrode.

The dilution of electrode metal by metal of the workpiece may be reduced materially and by a controlled extent by varying the temperature to which the electrode is preheated. In general, the higher the temperature of the electrode the lower the penetration of the workpiece and the lower the percentage dilution of deposited electrode metal, all other factors such as amperage of the welding current and size and rate of travel of the electrode being constant.

I claim:

1. In the art of electrically melting and depositing metal from an electrode onto a metal workpiece and simultaneously melting metal of the workpiece and coalescing such melted metal with the deposited metal by passing an electric melting current through said electrode to said workpiece and maintaining a gap between the electrode and workpiece, the improvement which consists in the step of applying only to said electrode heat, in addition to the heat derived from the electric melting current, in an amount sufficient to increase the ratio of melted electrode metal to melted workpiece metal.

2. The improvement claimed in claim 1, further characterized in that said additional heat is applied by high frequency alternating electric current induced only in said electrode adjacent the melting end thereof.

3. The improvement claimed in claim 1, further characterized in that said additional heat is applied by high temperature flames.

EGON B. SCHERL.